(12) United States Patent
Han et al.

(10) Patent No.: US 6,493,926 B2
(45) Date of Patent: Dec. 17, 2002

(54) BI-LAYER LIFT-OFF PROCESS FOR HIGH TRACK DENSITY GMR HEAD

(75) Inventors: Cherng-Chyi Han, San Jose, CA (US); Rodney Lee, San Jose, CA (US); Mao-Min Chen, San Jose, CA (US); Pokang Wang, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 96 days.

(21) Appl. No.: 09/835,023

(22) Filed: Apr. 16, 2001

(65) Prior Publication Data
US 2002/0148105 A1 Oct. 17, 2002

(51) Int. Cl.[7] .............................................. G11B 5/127
(52) U.S. Cl. ............................ 29/603.14; 29/603.13; 29/603.15; 29/603.18; 360/113; 427/130
(58) Field of Search ......................... 29/603.13, 603.11, 29/603.14, 603.15, 603.18, 603.2; 360/113, 121; 216/22, 66; 427/130, 131

(56) References Cited

U.S. PATENT DOCUMENTS

| 5,491,600 | A |   | 2/1996  | Chen et al. ................. 360/113   |
|-----------|---|---|---------|----------------------------------------|
| 5,664,316 | A |   | 9/1997  | Chen et al. ............... 29/603.08   |
| 5,883,764 | A |   | 3/1999  | Pinarbasi .................... 360/113  |
| 5,901,432 | A | * | 5/1999  | Armstrong et al. ......... 205/122      |
| 6,007,731 | A |   | 12/1999 | Han et al. ..................... 216/22 |
| 6,067,703 | A | * | 5/2000  | Takahashi et al. ........ 29/603.13     |
| 6,103,136 | A |   | 8/2000  | Han et al. ..................... 216/22 |
| 6,444,406 |   | * | 9/2002  | Ito et al. .................. 29/603.07 |

* cited by examiner

*Primary Examiner*—Gregory Huson
*Assistant Examiner*—Peter deVore
(74) *Attorney, Agent, or Firm*—George O. Saile; Stephen B. Ackerman

(57) ABSTRACT

A method for forming a bi-layer lift-off mask for use in fabricating an abutted junction type GMR read-head sensor with a narrow trackwidth of less than 0.5 microns. The mask has a novel suspension bridge structure that avoids problems associated with bilayer lift-off masks of the prior art, namely insufficient or excessive undercutting of the lower layer that produces fence formations in the conducting lead layer or collapse of the mask structure rendering removal difficult.

9 Claims, 4 Drawing Sheets

BI-LAYER LIFT-OFF PROCESS FOR HIGH TRACK DENSITY GMR HEAD

BACKGROUND OF THE INVENTION

1. Field of the Invention

This invention relates generally to the fabrication of a giant magnetoresistive (GMR) magnetic field sensor for a magnetic read head, more specifically to the formation of an abutted junction between the sensor element an conducting lead layers.

2. Description of the Related Art

Magnetic read sensors that utilize the giant magnetoresistive (GMR) effect for their operation are generally formed with abutted junctions. These junctions are the interfacial regions wherein the GMR sensor element is contacted electrically by a current lead layer and possibly also contacted magnetically by a longitudinal magnetic bias layer. The current lead layer injects the current into the sensor element that enables its magnetic moment variations and concurrent resistance variations to be converted into measurable voltage variations, while the magnetic bias layer maintains the integrity and stability of magnetic domains within the magnetic layers of the element. The method of forming the abutted junction is critical to the performance of the read element since the track width of the read portion of the element (ie., the width of its active portion) is essentially defined by the distance between the two junctions. If the trackwidth of the read element is to be held below about 0.5 microns, then the prior art methods of forming the abutted junctions have notable shortcomings.

In the prior art, as depicted schematically in FIGS. 1, 2, 3 and 4, abutted junctions are formed by removing portions of a deposited GMR layer with an ion-milling process using a bi-layer lift-off stencil as an ion-milling mask. FIG. 1 shows a substrate (1), over which has been formed a GMR sensor layer (2), which is to be milled to an appropriate shape for forming abutted junctions. In FIG. 2, an ion-milling mask has been formed by depositing a layer of photoresistive material (6) over a layer of PMGI (polydimethylglutarimide) polymer (4). By making use of the differential solubility of the photoresist polymer layer relative to the PMGI polymer layer, the PMGI layer can be undercut (8) beneath the photoresist. This structure is called a bi-layer lift-off stencil or lift-off mask. When the ion-beam etch (IBE) is then applied to the masked region (FIG. 3), the unnecessary portions of the GMR layer are removed (10), forming the required abutted junction profile (12) of the remaining GMR material. Having done its job as an ion-milling mask, the lift-off stencil now (FIG. 4) serves as a stencil for the deposition of a conductor lead layer and a magnetic bias layer (14).

Chen et al. (U.S. Pat. No. 5,664,316) discloses a multi-layered conductive lead structure consisting of layers of conductive material alternating with layers of refractory metal, such as layers of gold/nickel alloy alternating with layers of tantalum. This structure is brought into contact with a magnetoresistive (MR) layer at an abutted junction. The junction is formed by a subtractive process such as ion-milling wherein a bi-layer resist formed by a relatively thin underlayer and a thick imaging layer is used as a stencil to define each edge of the MR layer. The undercut is formed by dissolution of the underlayer in a suitable developing medium.

Chen et al. (U.S. Pat. No. 5,491,600) discloses the formation of an MR sensor in which a PMGI layer formed between a photoresist layer and a capping layer in order to facilitate the lift off process. The photoresist masks the active region of the sensor during the etching and deposition process for the conductive lead structures.

Pinarbasi (U.S. Pat. No. 5,883,764) discloses a method for forming abutted junctions, at which very thin and highly conductive lead layers, deposited over longitudinal bias layers, are connected to a spin-valve type sensor element. In FIG. 6 of Pinarbasi there is shown the undercut bi-layer lift-off mask of photoresistive material deposited over PMGI that was schematically described above. Pinarbasi further discloses an ion-beam milling process followed by a deposition process, also as described above.

Han et al. (U.S. Pat. No. 6,007,731) discloses a lift-off mask that is used as an etch stencil for an ion-beam etch. The lift-off stencil is formed on an MR layer by depositing a blanket release layer and depositing over that a photoresist layer. The photoresist layer is then photoexposed and the release layer beneath it is undercut by use of an isotropic etchant.

Han et al. (U.S. Pat. No. 6,103,136) discloses the formation of an MR sensor in which there is used a lift-off stencil comprising a patterned release layer formed on the MR layer and a patterned photoresist layer formed so as to symmetrically overhang the release layer.

As recording densities on magnetic media continue to increase, the associated read head sensors must have correspondingly narrower track widths. Using the lift-off stencil formation associated with the method of the prior art to form read sensors with track widths less than 0.5 microns leads to several difficulties that impinge negatively on the efficiency and quality control of the manufacturing process. Basically, in manufacturing environments it becomes increasingly difficult to control the degree of undercut of the PMGI layer that lies beneath the photoresist layer. If, as a result, the undercut is too small, "fencing" (excessive buildup of conducting or magnetic material around the abutted junction which contacts the undercut layer) will occur at the edges of the abutted junction formed between the conductive lead layer and the GMR layer. This fencing can lead to shorting between the conductive lead layer and the upper shield of the read/write head that is formed above the conductive lead layer. A schematic depiction of such fencing is shown in FIG. 5a.

On the other hand, if the undercut is too great, the overhang of the photoresist layer loses its support and can collapse during the layer deposition, as is illustrated schematically in FIG. 5b. If such collapse occurs, the removal of the lift-off stencil becomes a difficult problem and negatively affects the quality of the sensor as well as the efficiency of the manufacturing process. The present invention provides a new lift-off stencil structure that eliminates the problems of excessive undercut and inadequate undercut in a simple and novel manner.

SUMMARY OF THE INVENTION

A first object of this invention is to provide a method for forming conductive lead layers and magnetic bias layers on an abutted junction type GMR read element having a narrow track width.

A second object of this invention is to provide a method for forming conductive lead layers and magnetic bias layers on an abutted junction type GMR read element having a narrow track width, wherein the lead and bias layers so formed do not exhibit fencing (excessive material buildup in the vicinity of the junction which contacts the liftoff stencil)

which can lead to subsequent electrical shorting between the conducting layer and the upper shield formed over the GMR sensor element.

A third object of this invention is to provide a method for forming conductive lead layers and magnetic bias layers on an abutted junction type GMR read element having a narrow track width, wherein removal of the lift-off stencil used in forming said junction is not rendered difficult by its collapse during said formation process.

A fourth object of this invention is to provide a method for forming conductive lead layers and magnetic bias layers on an abutted junction type GMR read element having a narrow track width, wherein said method is robust and easily implemented within a manufacturing environment.

In accord with the objects of this invention there is provided a bi-layer lift-off stencil wherein the upper level region which defines the active area of the GMR sensor has a novel suspension-bridge shape with no material from the lower layer beneath it and is not, therefore, subject to problems of inadequate or excessive undercutting of its lower layer relative to its upper layer.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying figure, wherein:

FIG. 1 is a schematic representation of a GMR layer deposited on a substrate.

FIG. 2 is a schematic representation of a bi-layer lift-off stencil having an undercut lower layer formed on the GMR layer.

FIG. 3 is a schematic representation of the GMR layer of FIG. 2 subsequent to its being milled away, using the lift-off stencil as an ion-milling mask, to form edges for an abutted junction.

FIG. 4 is a schematic representation of the results of a deposition of a conducting lead layer, which might also include a magnetic bias layer, showing the lift-off stencil, which has now been used as a deposition mask, prior to its removal.

FIG. 5a shows the formation of a fence due to the undercut being inadequate.

FIG. 6b shows a schematic cross-sectional view taken through the double-headed arrow drawn in FIG. 6a.

FIGS. 7a and 7b show a top and frontal view of the GMR active region and the deposited lead layers subsequent to the use of the bi-layer lift-off mask. The frontal view in 7b is a cross-sectional view taken through the double-headed arrow shown in 7a.

DESCRIPTION OF THE PREFERRED EMBODIMENTS

The present invention provides a bi-layer lift-off stencil for forming an abutted junction type GMR sensor element having a very narrow track-width of less than 0.5 microns. The novel suspension-bridge shape of the stencil permits the formation of conducting lead layers and magnetic bias layers that abut the GMR layer without producing fences and subsequent lead-to-shield electrical shorting and without the problem of stencil collapse and associated removal difficulties.

Figure 1:
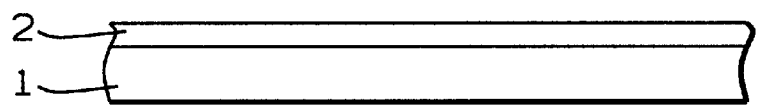
FIGS. 1 through 4 are schematic representations of a bi-layer lift-off stencil and its use in forming abutting junctions for a GMR read sensor element in accord with methods of the prior art.

Referring first to FIG. 1, there is shown a schematic representation of the first stage of the formation of an abutted junction GMR read sensor in accord with methods of the prior art. The figure shows a substrate on whose surface will typically be a layer of alumina (1) of thickness between 1 and 5 microns, on which alumina layer has been deposited a GMR sensor layer (2).

Figure 2:
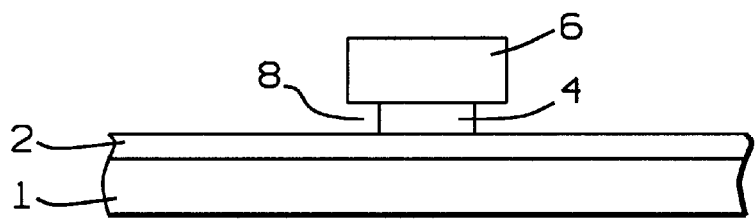

Referring next to FIG. 2, there is shown the schematic representation of the substrate-GMR layer fabrication of FIG. 1, wherein a bi-layer lift-off stencil for forming the abutted junction has now been formed in accord with methods of the prior art. The lift-off stencil consists of a lower layer of PMGI (polydimethyglutarimide) (4), on which has been deposited a layer of photoresist material (6), several of which are well known to practitioners of the prior art. Using any of several developing solutions known to practitioners of the prior art, the photoresist material has been developed to form the shape illustrated and the PMGI has been undercut (8) relative to the photoresist layer by making use of its differential solubility in the said developing solution.

Figure 3:
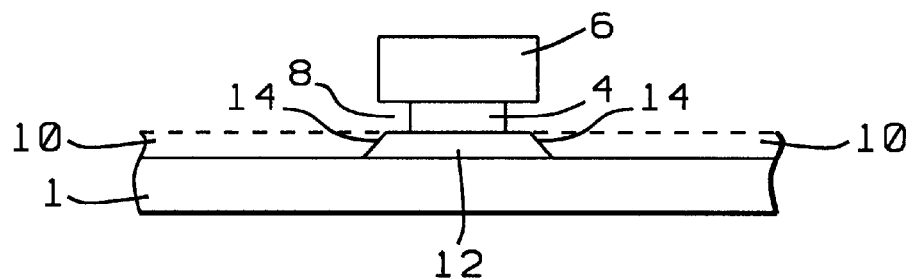

FIG. 3 shows a schematic illustration of the results of using the bi-layer lift-off stencil of FIG. 2 as an ion-beam milling mask, whereupon regions of the GMR layer have been removed (10) and the remaining segment of the GMR layer beneath the mask (12) has been had its edges shaped (14) appropriately to form an abutted junction.

Figure 4:
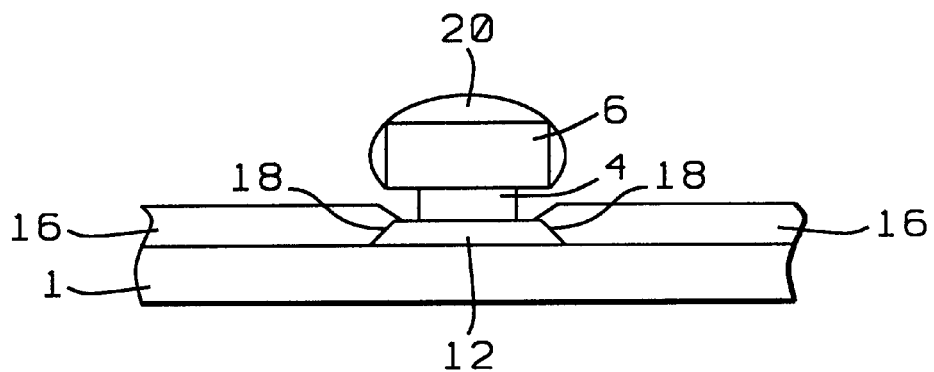

FIG. 4 shows a schematic illustration of the fabrication of FIG. 3, wherein a conducting lead layer (16) has now been deposited to form the abutted junction (18). The stencil, now ready for lift-off, is shown covered with lead layer residue (20) from the deposition process. It should be noted that various magnetic biasing layers may also be deposited along with the conducting lead layer, in which case the stencil will serve to shape those depositions as well.

Figure 5A:
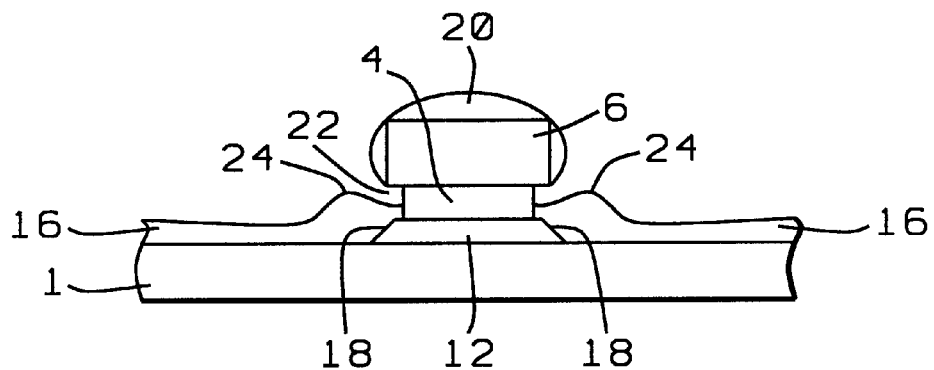
FIGS. 5a and b are schematic representations of the results of using such a prior art lift-off stencil for forming a narrow track-width GMR region.

FIG. 5a is a schematic representation of the results of using a lift-off stencil such as that illustrated in the previous figures, wherein the PMGI layer is inadequately undercut (22). In this case, which is common when the stencil is required to produce a narrow trackwidth sensor element, the deposition of the conducting lead layer produces fences (24) in the abutted junction region.

Figure 5B:
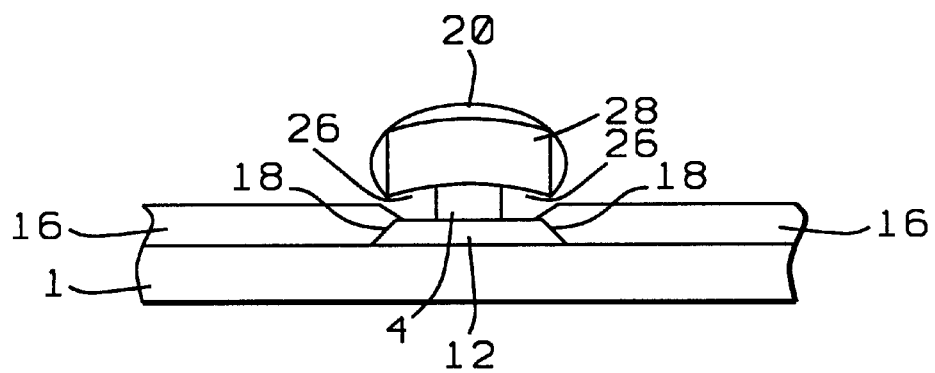
FIG. 5b shows a collapsed stencil resulting from excessive undercut.

FIG. 5b is a schematic representation of the results of using a lift-off stencil such as that illustrated in the previous figures, if the undercut PMGI layer is excessively undercut (26). In this case, which is common when the stencil is required to produce a narrow trackwidth sensor element, the entire stencil fabrication can collapse (28), making lift-off exceedingly difficult.

Figure 6A:
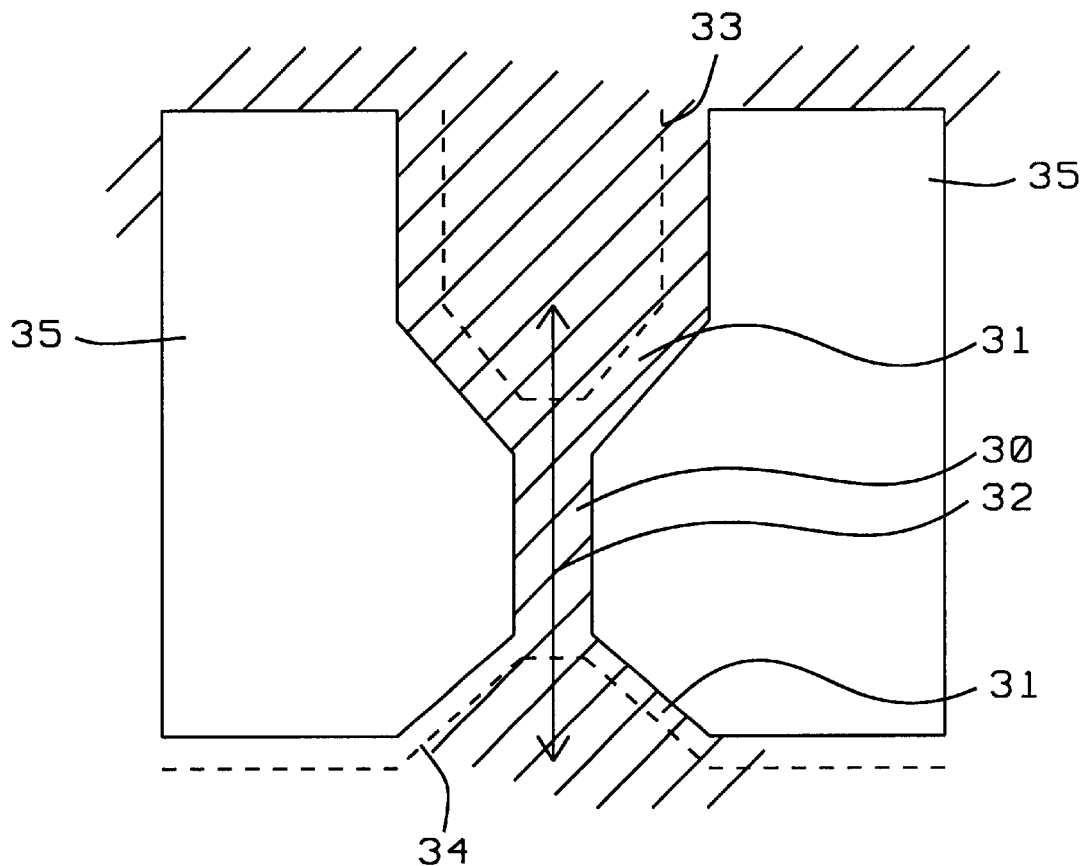
FIGS. 6a and 6b are schematic representations of overhead and frontal views of a bi-layer lift-off stencil of suspension-bridge shape formed according to the methods of the present invention. The active region defined by the upper photoresist layer is shown suspended over two supports provided by the lower PMGI layer. Milled-away regions for subsequent deposition of conductive lead layers are also shown.

FIG. 6a is a schematic representation of an overhead view of the bi-layer lift-off stencil formed in a suspension-bridge shape in accord with the methods of the present invention. The stencil is comprised of a PMGI layer of thickness between 0.04 and 0.1 microns, over which is formed a layer of photoresist material, which layer can be photoresist material such as the commercially available photoresist material PFI-81 or PFI-88, formed to a thickness of between 0.3 microns and 2.0 microns. The photoresist layer and the PMGI layer have been shaped as shown by the application of a developing solution such as the commercially available developing solution LDD26W or SFD238. The narrow region of the upper photoresist layer (30), which will be used to define the active region of the GMR layer, is suspended over the PMGI layer beneath it. The PMGI layer has been differentially shaped relative to the photoresist layer by application of the developing solution, to form the outlined support regions (33) and (34) for the photoresist layer above it. It is important that the length of photoresist region (30) be sufficiently short, between 1.5 and 2.5 microns and the regions of the photoresist (31) on either end of (30) flare out sufficiently so that the suspended region (30) is properly supported by the PMGI regions below them (33) and (34). The shape of the supports (33) and (34) are such that a void is formed beneath the photoresist layer at (30), whereby said region (30) is suspended directly above the GMR layer. Also shown in the figure are the two regions (35) also removed in the developing process which will serve as a stencil for the lead layer deposition.

Figure 6B:
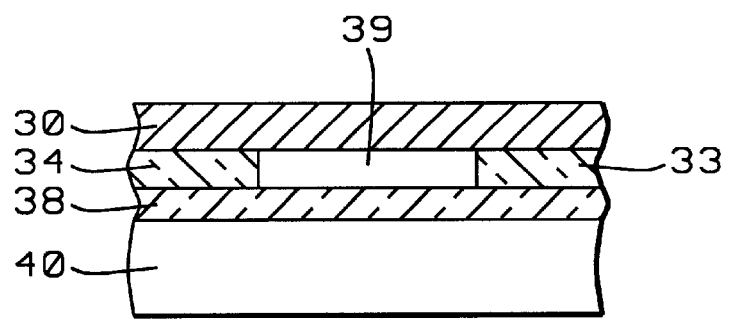

FIG. 6b is a schematic representation of a frontal view of the bi-layer lift-off stencil taken as a cross-section through the double-ended arrow (32) in FIG. 6a. The suspension-bridge shape formed in accord with the methods of the present invention can be clearly seen. The photoresist layer (30), of length between 1.5 microns and 2.5 microns, width between 0.05 microns and 0.5 microns and thickness between 0.3 microns and 2.0 microns forms a suspended span over the void (39) between the two support sections of PMGI layer (33) and (34), whose thickness is between 0.04 microns and 0.1 microns. The GMR layer (38) beneath the bi-layer is shown as is the substrate (40) on which the GMR layer is formed.

Figure 7A:
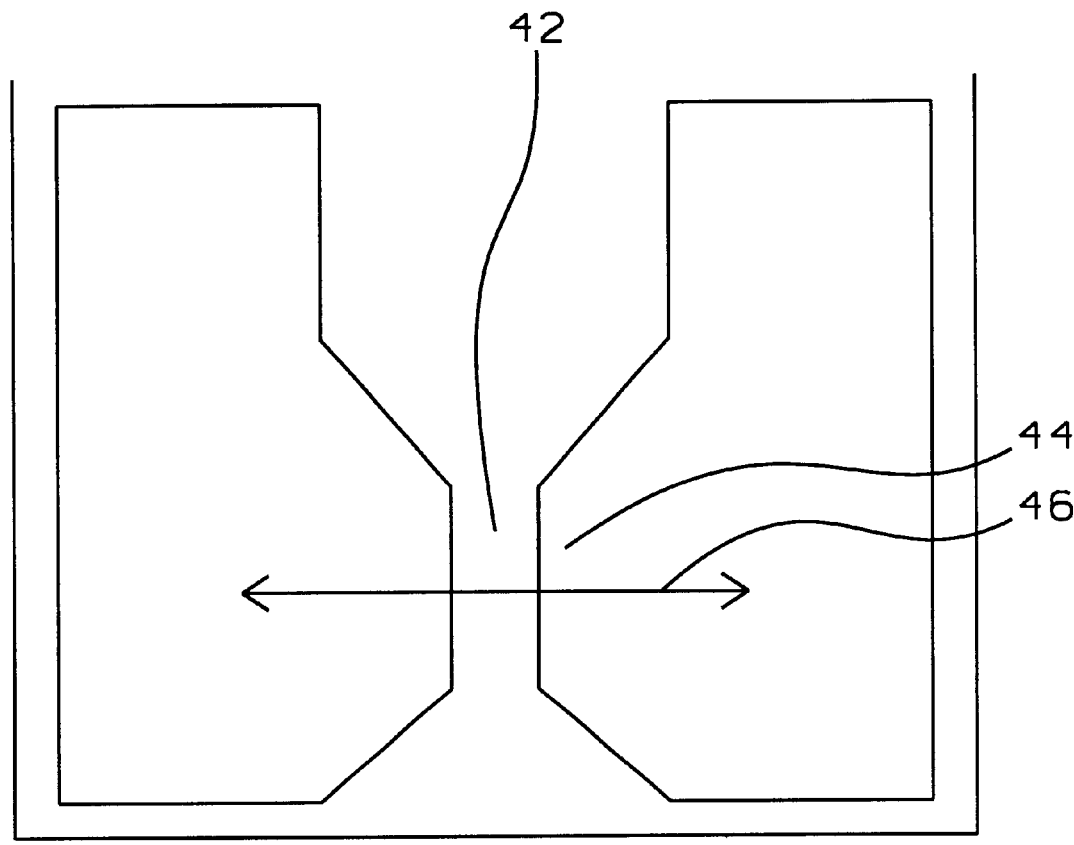
Figure 7B:
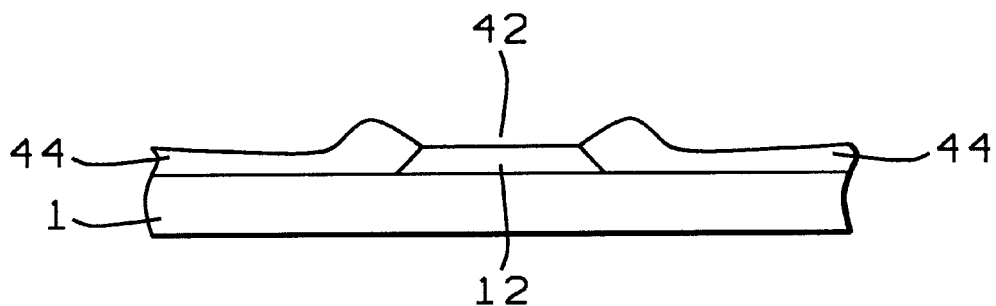

Referring finally to FIGS. 7a and 7b, there is shown an overhead (7a) and frontal view (7b) through the double-headed arrow (46), showing the active GMR region (42) and abutting junction lead layers (44) formed using the bi-layer lift-off stencil described above in accord with the method of the present invention. The narrow active region (42) has been precisely and sharply defined and the lead layers (44), which in this embodiment are a triple layer of Ta/Au/Ta whose total thickness is between 500 angstroms and 1500 angstroms, abut the active region with no fencing. It is to be noted that lead layers (44) may also include layers of magnetic biasing material.

As is understood by a person skilled in the art, the preferred embodiment of the present invention is illustrative of the present invention rather than limiting of the present invention. Revisions and modifications may be made to methods, materials, structures and dimensions employed in fabricating a bi-layer lift-off stencil for forming an abutted junction GMR read head, while still providing a method for fabricating a a bi-layer liftoff stencil for forming an abutted junction GMR read head in accord with the spirit and scope of the present invention as defined by the appended claims.

What is claimed is:

1. A method for forming a bi-layer lift-off stencil having a suspension-bridge shape for use in fabricating an abutted junction GMR read head sensor of narrow width comprising:

providing a substrate;

forming on said substrate a GMR layer;

forming on said GMR layer a layer of PMGI of thickness between 0.04 and 0.1 microns;

forming on said PMGI layer a layer of photoresist material of thickness between 0.3 and 2.0 microns;

patterning and developing said photoresist layer and PMGI layer so as to form a suspension-bridge shaped bi-layer structure.

2. The method of claim 1 wherein the substrate comprises at least a layer of alumina of thickness between 1.0 microns and 5.0 microns.

3. The method of claim 1 wherein the photoresist material is patterned to form a suspension-bridge region of length between 1.5 microns and 2.5 microns and of width between 0.05 microns and 0.5 microns, said region forming a continuous connection between flared regions of said photoresist material of width between 0.05 microns and 0.5 microns.

4. The method of claim 1 wherein the developing of said photoresist layer also removes portions of the PMGI layer beneath it, thereby leaving a void beneath the suspension-bridge region of said patterned photoresist layer and forming supporting regions of said PMGI layer beneath said flared regions of said photoresist layer.

5. A method for forming an abutted junction GMR having a narrow trackwidth using a novel bi-layer lift-off stencil of suspension-bridge shape, comprising:

providing a substrate;

forming on said substrate a GMR layer;

forming on said GMR layer a layer of PMGI;

forming on said PMGI layer a layer of photoresist material;

patterning and developing said photoresist layer and PMGI layer to form a suspension bridge shaped lift-off stencil;

removing a region of said GMR layer using a method of ion-milling wherein the bi-layer suspension-bridge shaped lift-off stencil serves as an ion-beam milling mask and forming, thereby, a narrow active region of said GMR layer having sharply defined edges suitable for the formation of abutted junctions with conducting lead layers and magnetic bias layers;

depositing, using a line-of-sight method of ion-beam deposition (IBD), a layer of conducting material, which may also include a layer of magnetic biasing material, whereby the bi-layer suspension-bridge shaped lift-off stencil now serves as a IBD deposition mask, so as to form an abutted junction with said edge portions of the GMR layer;

removing said bi-layer lift-off stencil;

forming over the resulting fabrication an insulating layer and an upper shield layer.

6. The method of claim 5 wherein the substrate comprises at least a layer of alumina of thickness between 1.0 microns and 5.0 microns.

7. The method of claim 5 wherein the photoresist material is patterned to form a suspension-bridge region of length between 1.5 microns and 2.5 microns and of width between 0.05 microns and 0.5 microns, said region forming a continuous connection between flared regions of said photoresist material of width between 0.05 microns and 0.5 microns.

8. The method of claim 5 wherein the developing of said photoresist layer also removes portions of the PMGI layer beneath it, thereby leaving a void beneath the suspension-bridge region of said patterned photoresist layer and forming supporting regions of said PMGI layer beneath said flared regions of said photoresist layer.

9. The method of claim 5 wherein the conducting lead layer is a layer of Ta/Au/Ta deposited to a thickness of between 500 angstroms and 1500 angstroms.

* * * * *